July 15, 1958 S. THALER ET AL 2,843,837

DIGITAL COMPARISON GATE

Filed Dec. 8, 1955

INVENTORS.
SAMUEL THALER
ERNIE R. RUTERMAN
BY Wade Koontz
ATTORNEY
James S. Shannon
AGENT 2,843,837

DIGITAL COMPARISON GATE

Samuel Thaler, Rome, N. Y., and Ernie R. Ruterman, Douglas, Ariz., assignors to the United States of America as represented by the Secretary of the Air Force Application December 8, 1955, Serial No. 551,965

1 Claim. (Cl. 340—149)

(Granted under Title 35, U. S. Code (1952), sec. 266)

The invention described herein may be manufactured and used by or for the United States Government for governmental purposes without payment to me of any royalty thereon.

The object of this invention is to provide a digital comparison circuit that will produce an electrical signal when a number which is being accumulated in a binary counting device has reached a prescribed value. A particular object is to provide such a circuit that is simpler and has fewer components than previous arrangements for accomplishing this function.

In the binary number system a digit may have one of the two values 1 and 0. The digit 1 is greater than the digit 0, and two digits are equal if both are 1 or both are 0. Further, a binary number A constructed with $n$ digits $A_1$, $A_2$, . . . $A_n$ is equal to a binary number B constructed of $n$ digits $B_1$, $B_2$ . . . $B_n$ when each digit of A is equal to the corresponding digit of B.

In many applications, one number, for example the number A, is an increasing number which is initially less than another number B and it is desired to produce a signal when A becomes equal to B.

As stated above, when A equals B the corresponding digits of A and B are equal. Therefore, for each pair of corresponding digits $A_k$ and $B_k$, either $A_k$ must equal 1 or $B_k$ must equal 0. If A is less than B, these criteria are not met since, for A to be smaller than B, at least one digit of A must be less than the corresponding digit of B so that for at least one digit pair $A_k$ is 0 while $B_k$ is 1.

The criteria described above can also be met for some values of A greater than B. However, in the situation where A is an increasing number initially smaller than B, A cannot become greater than B without first being equal to B. Therefore, the final equality criteria require that, for each pair of corresponding digits, either $A_k$ is 1 or $B_k$ is 0 and A has not yet become equal to B.

The complement of a binary digit $B_k$, denoted by the symbol $\overline{B}_k$, is defined by stating that $\overline{B}_k$ is not equal to $B_k$. In other words, if symbol $B_k$ is 0 $\overline{B}_k$ is 1, and conversely, if $B_k$ is 1 $\overline{B}_k$ is 0. The number $\overline{B}$, defined as the complement of the binary number B, is constructed of a sequence of digits $\overline{B}_1$, $\overline{B}_2$, . . . $\overline{B}_n$ such that each digit of the number $\overline{B}$ is the complement of the corresponding digit of the number B.

The digital comparison gate described herein compares A and $\overline{B}$, the complement of B. Therefore, the gate generates a signal when, for each of the corresponding digit pairs, either $A_k$ or $\overline{B}_k$ is 1 and A has not previously been equal to B.

Briefly, in accomplishing this result, the corresponding digits of A and $\overline{B}$ are used as inputs to $n$ "or" gates and the outputs of these "or" gates are used as inputs to $n$ of the $n+1$ inputs of an "and" gate. The $n+1$ input of the "and" gate is obtained from an electronic switch whose output is initially 1. The output of the "and" gate is used to change the state of the switch so that its output changes to 0 when A becomes equal to B. This prevents the generation of outputs when A is greater than B.

A more detailed description of the invention will be given in connection with the specific embodiment thereof shown in the drawings in which Fig. 1 shows the digital comparison gate in block form;

Figures 1, 2, 3, 4:
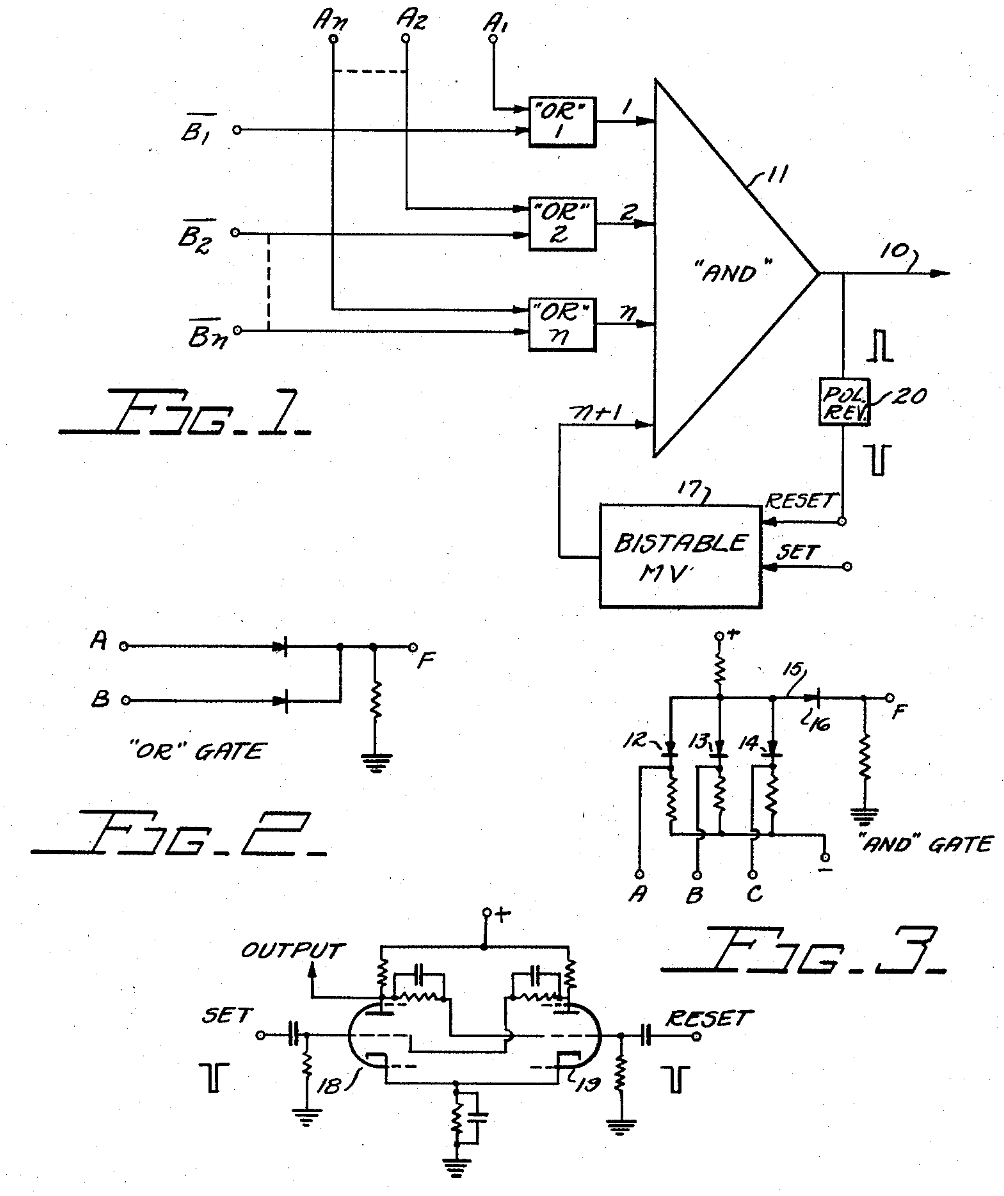
Fig. 2 illustrates a suitable "or" gate for use in Fig. 1.
Fig. 3 illustrates a suitable "and" gate for use in Fig. 1.
Fig. 4 illustrates a suitable electronic switch for use in Fig. 1.

Referring to Fig. 1, the circuit shown therein produces an output on line 10 when increasing binary number A becomes equal to a reference binary number B. The digits $A_1$, $A_2$ . . . $A_n$ of the number A are simultaneously applied to the terminals so designated in Fig. 1 in the form of electrical pulses such that, for example, the digit 1 is represented by the presence of a pulse and the digit 0 by the absence of a pulse. In a similar manner the digits $\overline{B}_1$, $\overline{B}_2$, . . . $\overline{B}_n$ of the complement of the reference number B are applied simultaneously as electrical pulses to the terminals so designated in Fig. 1. The $A_1$ and $\overline{B}_1$ terminals constitute the input terminals to "or" gate 1, the $A_2$ and $\overline{B}_2$ terminals are the input terminals to "or" gate 2 and so on to the nth "or" gate for which the $A_n$ and $\overline{B}_n$ terminals serve as inputs.

The characteristics of an "or" gate are well understood in the digital computer art. An "or" gate is a circuit having a plurality of input circuits and an output circuit in which energization of any one or more of the input circuits will produce an output from the gate. A simple analogy is that of parallel electrical switches in which closure of any switch will complete the circuit. Gates of this type may be realized in a number of ways well known in the art. An example is shown in Fig. 2. In this Figure A and B are input terminals and F the output terminal. Application of a positive pulse to either terminal A or terminal B will cause a positive pulse to appear at terminal F.

From the above it is evident that if either $A_k$ or $\overline{B}_k$, representing any pair of corresponding digits in the binary numbers A and $\overline{B}$, is 1, or if both are 1, the output from the corresponding "or" gate is 1, and if both $A_k$ and $\overline{B}_k$ are 0 the output of the "or" gate is 0.

The outputs of "or" gates 1 . . . $n$ are applied to $n$ of the $n+1$ input circuits of "and" gate 11. The characteristics of an "and" gate are also well understood in the digital computer art. The "and" gate differs from an "or" gate in that simultaneous energization of all of its input circuits is required in order for an output to be produced. A simple analogy is that of series connected electrical switches in which closure of all switches is required to complete the circuit. Gates of this type may also be realized in a number of different ways well known in the art. An example of an "and" gate suitable for use in Fig. 1 is shown in Fig. 3. This circuit is so arranged that if any of the diodes 12, 13 and 14 is conductive the potential of conductor 15 will be below ground and diode 16 will be nonconductive. In order for an output pulse to appear at terminal F it is necessary to apply positive pulses to input terminals A, B and C simultaneously and of sufficient amplitude to render diodes 12, 13 and 14 nonconductive. When this occurs the potential of conductor 15 rises above ground causing diode 16 to conduct and a positive pulse to appear at output terminal F.

The remaining $n+1$ input to "and" gate 11 is derived from an electronic switching device 17 which normally has an output corresponding to the digit 1. Therefore, if "and" gate 11 is of the type shown in Fig. 3, the output of switch 17 is normally a positive potential exceeding a predetermined amplitude. A suitable form for this switch is a bistable circuit of the type shown in Fig. 4. The output of this circuit is applied to the $n+1$ input of "and" gate 11. Normally tube 18 is nonconductive and tube 19 is fully conductive, this being one of the two stable conditions of the circuit. In this condition the output is a positive voltage of maximum value which is made sufficient to act as an input for the "and" gate. If the circuit is not in the above condition it may be triggered to this condition by application of a momentary negative voltage to the "set" terminal. In the other condition of stability of the circuit, tube 18 is conductive and tube 19 is non-conductive. The output voltage for this condition has a minimum value which is below the value required to serve as an input to the "and" gate. When an output occurs from "and" gate 11 it is applied to the reset terminal of the bistable circuit and serves to switch it to the last described condition of stability. Since, if gate 11 is of the type shown in Fig. 3, its output will be a positive pulse, a polarity reversing circuit 20 is included between the "and" gate output and the "reset" terminal of the bistable circuit to provide the correct polarity for triggering this circuit.

The operation of the digital comparison circuit of Fig. 1 is as follows: The digits of increasing binary number A are applied simultaneously to terminals $A_1 \ldots A_n$. Assuming that "or" and "and" gates of the types shown in Figs. 2 and 3 are used, these digits are applied in the form of a positive pulse to represent a 1 and the absence of a pulse to represent a 0. Similar voltages representing the digits of the complement of the reference number are applied to terminals $\overline{B}_1 \ldots \overline{B}_n$. The bistable multivibrator 17 is set so that its output is a positive voltage of sufficient amplitude to serve as an input to the "and" gate 11. Assuming the circuit of Fig. 4 to be used, in this condition of the circuit tube 18 is cut off and tube 19 is conductive.

When A is less than B at least one digit of A will be less than the corresponding digit of B, and therefore, for at least one pair of corresponding digits $A_k$—$\overline{B}_k$, both $A_k$ and $\overline{B}_k$ will be 0. Consequently, when A is less than B, at least one of the "or" gates will have two 0 inputs and therefore a 0 output. With less than all its inputs energized there is no output from "and" gate 11.

When A becomes equal to B, reviewing what has previously been said, each digit of A equals the corresponding digit of B, from which it follows that each digit of A is equal to 1 or the corresponding digit of $\overline{B}$ is equal to 1. Therefore when A becomes equal to B each of the "or" gates will have an output since in each case one of the two "or" gate inputs is a 1. The "or" gate outputs together with the output of the bistable circuit 17 act to simultaneously energize all input circuits of "and" gate 11 resulting in a positive output pulse on line 10.

It is also possible for an output to occur in all $n$ of the "or" gates for values of A greater than B as may be seen in the following example:

| | |
|---|---|
| A | 111010011 |
| B | 111010010 |
| $\overline{B}$ | 000101101 |

Here each "or" gate will have either one or two 1, or positive pulse, inputs and therefore will have an output. It is the purpose of bistable circuit 17 to prevent false outputs on line 10 for values of A greater than B. This is accomplished by applying the output pulse on line 10 produced when A becomes equal to B, after a polarity reversal by circuit 20, to the "reset" terminal of the bistable circuit 17. As seen in Fig. 4, this negative pulse is applied to the grid of conductive tube 19 and triggers the circuit to its other condition of stability in which tube 18 is conductive and tube 19 is cut off. The output of circuit 17 as a result is lowered below the value required to act as an input to "and" gate 11 thus inhibiting this gate and preventing outputs therefrom for values of A greater than B.

When a new comparison of A relative to B is to be made, circuit 17 is returned to its original state by application of a short negative pulse in any suitable manner to the "set" terminal (Fig. 4).

The digital comparison gate will also operate in the above described manner when A is initially less than B and B decreases in magnitude until A and B are equal. Further, any type of distinguishable signals may be used to represent the binary digits 1 and 0 provided the gates are designed to function with the type signal chosen.

We claim:

A circuit for comparing two $n$-digit binary numbers one of which is approaching the other in size and for producing a signal when the two numbers become equal, the two binary digits 1 and 0 of said binary numbers being represented by distinguishable electrical signals, said circuit comprising: $n$ "or" gates each having first and second input circuits and an output circuit, said "or" gates having the characteristic that a signal appears in the output circuit of the gate only when the signal representing binary digit 1 is applied to at least one of the inputs to the gate, means for applying the signals representing the binary digits of the smaller of said binary numbers to the first input circuits of said "or" gates, means for applying signals representing the complements of the binary digits of the larger of said binary numbers to the second input circuits of said "or" gates, the signals applied to each "or" gate representing digits of corresponding order, an "and" gate having $n+1$ input circuits and an output circuit, said "and" gate having the characteristic that signals must be applied to all its input circuits in order to produce a signal in its output circuit, means connecting the output circuits of said "or" gates to $n$ of the input circuits of said "and" gate, means normally applying a signal to the remaining input circuit of said "and" gate, said last named means also being connected to the output circuit of said "and" gate and acting upon the appearance of a signal in said output circuit to remove the signal applied to said remaining input circuit.

References Cited in the file of this patent

UNITED STATES PATENTS

| | | |
|---|---|---|
| 2,615,127 | Edwards | Oct. 21, 1952 |
| 2,735,082 | Goldberg | Feb. 14, 1956 |
| 2,798,216 | Goldberg | July 2, 1957 |
| 2,799,845 | Dieterich | July 16, 1957 |